July 4, 1950 L. V. GROVER 2,513,560
CUT FILM HOLDER FOR CAMERAS
Filed March 18, 1946 2 Sheets-Sheet 1

Inventor
LYNDON V. GROVER
by The Firm of Charles H. Lilly
Attys.

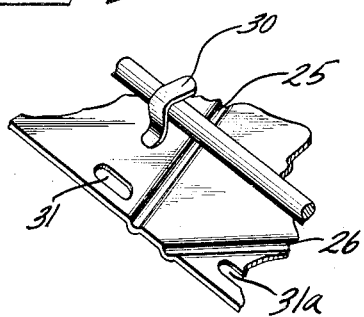
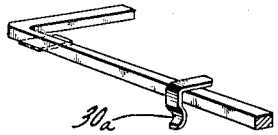
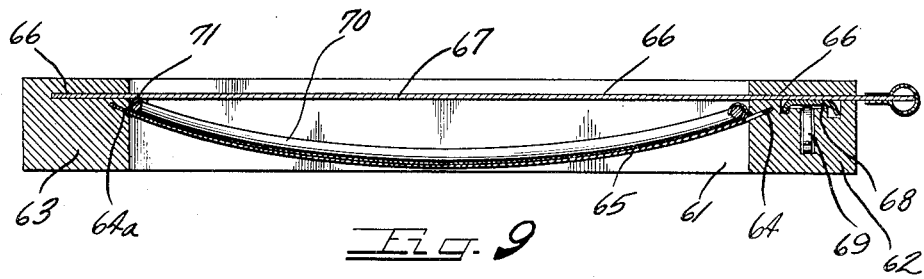
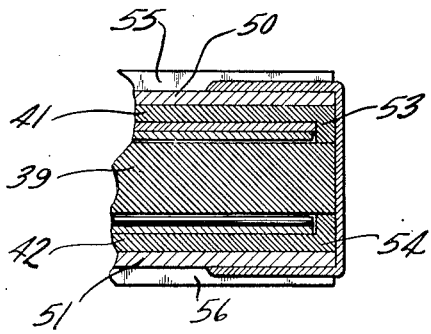
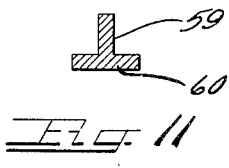
Inventor
LYNDON V. GROVER Patented July 4, 1950

2,513,560

UNITED STATES PATENT OFFICE 2,513,560

CUT FILM HOLDER FOR CAMERAS

Lyndon V. Grover, Los Angeles, Calif.

Application March 18, 1946, Serial No. 655,221

1 Claim. (Cl. 95—68)

The present invention relates to cut film holders for cameras and more particularly to improvements in the construction of holders for cut film used in cameras for photographic purposes.

More particularly, the invention contemplates a holder constructed to contain two cut films which are held in place against a partition or backing plate by narrow frames for engaging the marginal portions of the films, which frames are hinged to the holder to be swung against or away from the films for securement or removal of the films with respect to the holder.

An object of the present invention is to provide a holder for cut films, wherein the films may be inserted and removed with minimum effort.

Another object of the present invention is to provide a holder for cut films constructed to eliminate film slots or retention flanges.

A still further object of the present invention is to provide a holder for cut films which is strong, rigid, light, and easy to use.

The invention has for an additional object the provision of a holder for cut films constructed of metal of light weight which metal is of such character as to be free of contamination by emulsion on the films.

Another and yet further object of the present invention is to provide a holder for cut films in which marginal frame means hinged to the holder retain films in place by pressing a film against a partition or backing plate.

A still further object of the present invention is to provide a holder for cut films with a backing plate having ribs formed in one of its surfaces, the apices of the ribs constituting the focal plane.

Another and further object of the invention is to provide a holder for cut films to support the films in a camera without the use of an adaptor.

The invention has for an additional object the provision of a holder for cut films which may be manufactured at low cost below that of wooden and metal holders now on the market.

The invention has for a still further object the provision of a holder for cut films constructed without grooves or slots and wherein films may be inserted without undue handling.

An additional object of the present invention is to provide a holder for cut film in which the film is supported in curved position with respect to the focus of the lens and any part of the film, in one of its dimensions, is substantially the same distance from the lens focus as any other part of the film.

A further and additional object of the present invention is to provide a holder for a cut film having a backing plate providing a focal surface all points of which are substantially the same distance from the lens.

A yet further object of the present invention is to provide a holder for a cut film having a backing plate curved to approximate an arc described with a radius substantially that of the focal length of the lens and having its center in the lens axis.

The above, other and further objects of the present invention will be apparent from the following description and accompanying drawings.

The embodiments of the present invention are illustrated in the accompanying drawings and the views thereof are as follows:

Figure 5 is a fragmental isometric view of a part of the partition or backing member, adjacent the lower rail of the holder, showing one manner of means for latching the marginal frame to the backing member.

Figure 6 is a fragmental isometric view of a portion of the partition or backing member, adjacent the upper rail, showing struck-out tongues constituting hinges for the marginal frames.

Figure 7 is an isometric view of a portion of a marginal frame member of rectangular cross-section.

Figure 8 is a side elevational view of another form of marginal frame, which is resilient, showing in full lines its normal or open position, and in dotted lines in flatwise engagement against a film in one of the dark chambers of the holder.

Figure 9 is a vertical sectional view through a holder having a backing plate which is curved from end to end to support a film in curved position in a surface which approximates an arc described with a radius substantially that of the focal length of a lens and with the center of the arc in the lens axis.

Figure 10 is fragmental vertical sectional view taken in the plane of line X—X of Figure 4, and Figure 11 is a cross section through a marginal frame of T shape.

As shown on the drawings:

Figure 1:
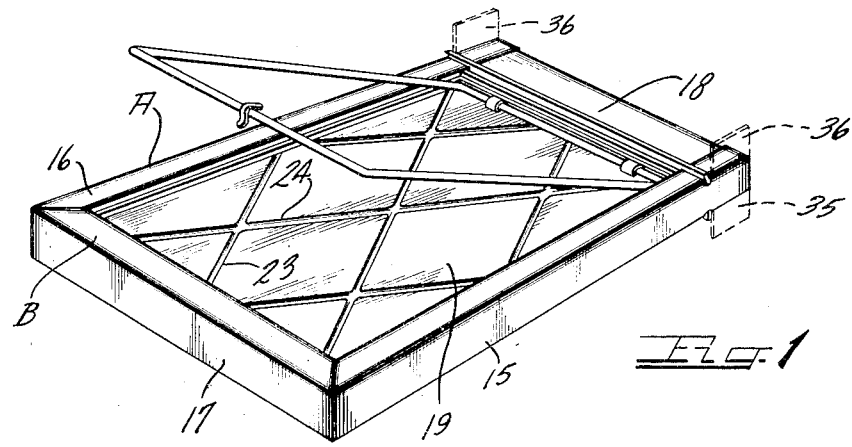
Figure 1 is an isometric view of the holder of the present invention, showing one of the two dark chambers, and showing the marginal frame for that chamber partially open.

Referring to Figure 1, a holder A is there shown, which includes side members 15 and 16, a bottom member 17 and a top member 18. Substantially midway of the height of the various members is a partition or backing member 19 which divides the holder into two dark chambers 20 and 21.

The members 15, 16, 17 and 18 are suitably grooved to receive dark slides, one of which is shown at 22, for normally closing the dark compartments 20 and 21.

The partition or backing member 19 is formed with intersecting ribs 23 and 24 which project from one surface of the backing plate as may be noted in Figure 5, thus forming corresponding depressions 25 and 26 in the opposite surface of the backing plate. The apices of the ribs 23 and 24 constitute the focal plane of the dark chamber 20 while the flat surface of the other side of the plate 19 constitutes the focal plane for the dark chamber 21.

Figure 4:
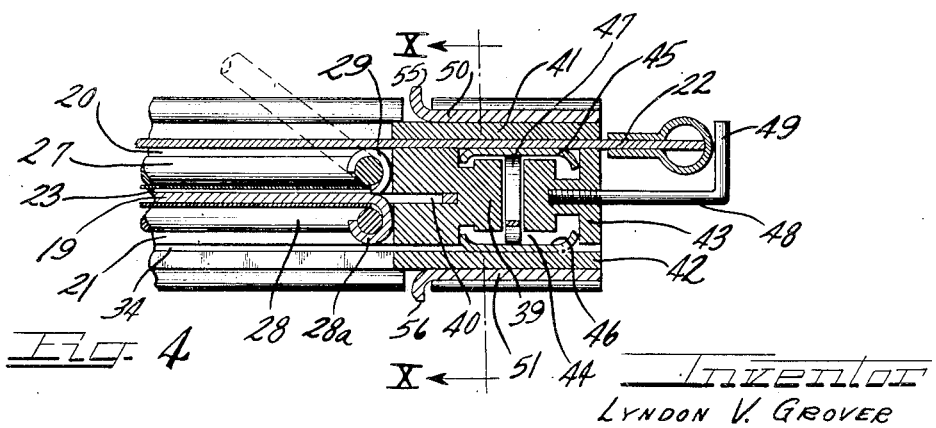
Figure 4 is an enlarged, fragmental, vertical scectional view through the top frame member of the holder, showing one dark slide in place, the other removed, and showing the marginal frame for one of the dark chambers in position closed against the partition or backing member, and in dotted lines, the marginal frame for the other dark chamber in partially open position.

Hinged in the dark chambers 20 and 21 are marginal frames 27 and 28 which are hinged at similar ends to the partition or backing plate 19 adjacent the top member 18. Any suitable means may be provided for effecting hinge connection of the marginal frames with the backing plate. Preferably lugs 28a and 29a are struck outwardly from opposite surfaces of the plate 19 and bent around an end of a frame to hinge it to the backing plate 19 (Figure 4). The other end of each frame may be provided with means for latching these ends to the holder, in any suitable manner.

The illustrated manner of latching the marginal frames comprises tongues 30 fastened to the swinging ends of the frames adapted to make snap engagement with suitably disposed holes 31, 31a in the backing plate 19, as may be observed in Figure 5.

It is to be understood that the marginal frame 27 in the dark compartment 20 rests on top of the ribs 23 and 24 whereas the marginal frame 28 in the dark compartment 21 rests against the opposite surface of the partition or backing plate 19.

In order to construct the frame so that it will be light, and easy to use, and at the same time formed of metal free of contamination by the emulsion on the film, the side and bottom members of the holder are formed of superposed extruded metal parts, made in any suitable number of pieces and made preferably of magnesium.

Figures 2, 3:
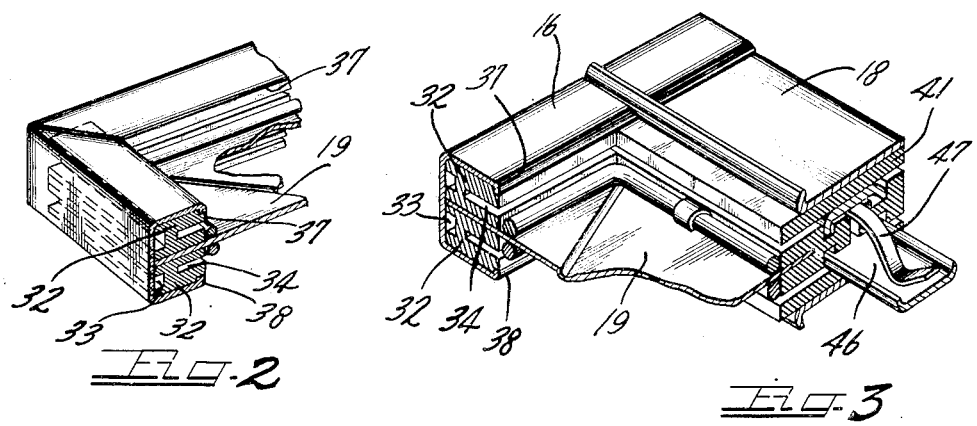
Figure 2 is a section through the upper left-hand corner of the frame of Figure 1, showing certain details of construction.
Figure 3 is a sectional view of the upper right-hand corner of the frame of Figure 1, showing certain details of construction.

The extruded parts for the side and bottom members are constructed as shown in Figures 2 and 3. Referring to Figure 2, it will be noted that there are two similar bars 32 having grooves 33 along their outer margins for lightness, and grooves 34 along their inner margins, to constitute the grooves for receiving the dark slides 22. From Figure 3 it will be noted that the side members 15 and 16 are formed of similar members 32. When the members 32 are assembled, the partition or backing plate 19 is inserted between two bars for any of the members, into substantially rectangular relationship, whereupon a U-shaped cover, designated generally as B, is applied from the bottom of the holder and slid along the length of the members 32 constituting the side members of the holder. The upper extremities of the legs of the U-shaped cover B are unbent, as indicated by dotted lines at 35 and 36 in Figure 1. The side portion and bottom portion of the U-shaped frame B are shaped as channels in cross-section. After the U-shaped frame member B is applied over the bars 32 constituting the side and bottom members, the marginal portions 37 and 38 of the flanges, are bent inwardly, as shown in Figures 2 and 3, to firmly unite the bars and partition or backing plate 19 in rigid relationship.

The top member 18 of the holder comprises several parts. One of these parts, a block 39, is provided with a slot 40 to receive the adjacent portion of the partition or backing plate 19. The outer faces of the block 39 coincide with the inner surfaces of the grooves 34 in the side member bars 32 to constitute continuations of the slides or guideways for the dark slides 22. Spaced from the outer surfaces of the block 39, are similar plates 41 and 42 secured in place so as to constitute continuations of the dark slide guideways and the bars 32 of the side members 15 and 16. Another block 43 is supported parallel to the block 39 and spaced from it to form a gap 44. Certain margins of the blocks 39 and 43 are spaced from the dark slide guideways to receive plates 45 and 46 constituting light blocks for preventing the entrance of light to a dark chamber as the dark slide for that chamber is withdrawn from the holder. These plates 45 and 46 are pressed against dark slides 22 by spring means 47, of any suitable kind, but herein shown as a single piece of undulatory form, working within the gap 44. Threaded into the block 43 is a screw 48 having a bent end 49 which may be moved over a dark slide 22 to prevent removal of the slide from the holder. Another similar screw is provided for the other dark slide.

As may be noted in Figure 10, the outer portions of the plates 41 and 42 have flanges 53 and 54 to rest against the blocks 39 and 43 to hold them in place and constitute the bottoms of the dark slide guideways.

Strip members 50 and 51 each having outturned flanges 55 and 56 respectively, are applied over the plates 41 and 42. The parts are held by a jig and the portions 35 and 36 at the ends of the legs of the U-shaped frame member B are then bent downwardly against the strips 50 and 51, as may be observed in Figures 1, 3 and 4. In this manner the various members constituting the holder are secured rigidly together in a manner to properly function.

When it is desired to load the holder of the present invention, in a dark room, one of the marginal frames 27 is released from its engagement with the backing member 19 and is swung upwardly so that a film may be placed on the backing member in that particular chamber, emulsion side up, which may be done as the film fits the dark chamber accurately so that it is unnecessary to move the film about in the chamber to center it. When it has been laid on the backing member as described, the marginal frame 27 is moved against it and latched. The dark slide 22 for that chamber is then inserted to cover the chamber. The holder is then reversed and the dark chamber on the other side of the backing member is loaded in the same manner. When the holder has been loaded, the dark slides 22 inserted, the screws 48 are turned so that the heads 49 thereof overlie the ends of the dark slides 22 to prevent removal of the slides from the holder.

When it is desired to make an exposure, the holder is inserted in the camera with the flanges 55 and 56 against stops in the camera, the screw 48 overlying the dark slide 22 of the dark chamber which is to be opened to expose the film, is moved away from the slide, the slide removed, the exposure made, the slide returned and the screw turned to prevent removal of the slide. The holder is then taken out of the camera and reversed so as to expose the film in the other dark chamber.

The marginal frames 27 shown in Figures 1, 3, 4 and 5 are made of wire of suitable shape.

If desired, the frames may be made of strips of metal of rectangular cross-section, as illustrated in Figure 7.

If greater pressure against the films is desired, than can be afforded by simply latching the marginal frames in place, the frames may be made of springy or resilient material, as shown in Figure 8, to be stressed when latched in place against the backing plate to thereby increase holding pressure against the films. Such frame is hinged at one end to the backing plate 19 and its free end would then be above the plate. A catch 58 is applied to the free end of the frame to engage an opening 31 and 31a in the plate 19 to hold the frame against the film in that dark chamber.

Another form of marginal frame 59 may be T-shaped in cross-section, as shown in Figure 11. When such T-shaped marginal frame is used, the head 60 of the T is arranged to rest against the marginal portion of the film.

The present invention lends itself very readily to the formation of a cut film holder having a backing plate which is curved so as to curve an inserted film in a manner to approximate an arc described with the focal length of the lens as a radius and with the center in the axis of the lens. In this manner, the end portions of the film will be better focused than if the film remained flat. The degree of curvature, of course, depends on the depth available in the holder, as the curve must, of course, be held within the limits of the holder dimensions.

Figure 9 is a section through such a holder, having as marginal portions side 61 and ends 62 and 63. A backing plate 65 bent as shown is supported in the ends 62 and 63 by entering the ends of the plate in inclined notches 64 and 64a cut in the ends 62 and 63, thus retaining the plate in bent position. Suitable grooves 66 are provided for receiving a dark slide 67. A light block plate 68 is arranged in the top end piece 62 urged to blocking position by a spring 69 of any suitable form. A marginal frame 70 is hinged to the plate 65 adjacent the top end 62 and bowed lengthwise to conform to the bent plate 65. A catch 71 is provided to hold the frame against a film on the plate 65 to maintain the film against the plate. Suitable lock means for the dark slide 67 are provided.

It will be noted that the film holder of the present invention eliminates film slots and reduces to a minimum the handling of a film for insertion in and removal from the holder. The surface area of engagement of the marginal frames is minimum so that little, if any, of the film margin is obscured.

Furthermore the provision of the marginal frame holds the film tightly against the backing plate against accidental shift.

I prefer to use magnesium for the extruded members as it is light in weight, strong and possesses less chemical reaction to film emulsion than aluminum.

It will, of course be understood that various details of construction may be varied through a wide range without departing from the principles of this invention and it is, therefore, not the purpose to limit the patent granted hereon otherwise than necessitated by the scope of the appended claim.

I claim as my invention:

In a cut film holder having an outer frame and a backing plate fixed within said frame to constitute the focal plane for a photographic film placed thereon, means for securing said film against said backing plate comprising a marginal frame fitting within said outer frame, lugs formed integrally with said backing plate and engaging one side of said marginal frame to attach the marginal frame to said backing plate for swinging movement toward and away from the backing plate, and a catch carried by the opposite side of said marginal frame for engaging said backing plate, whereby said marginal frame may be secured to said plate in contact with the marginal edges of said film placed on said backing plate.

LYNDON V. GROVER.

REFERENCES CITED

The following references are of record in the file of this patent:

UNITED STATES PATENTS

| Number | Name | Date |
|---|---|---|
| 315,219 | Barker | Apr. 7, 1885 |
| 476,203 | Hetherington | May 31, 1892 |
| 766,869 | Borsum | Aug. 9, 1904 |
| 1,343,773 | Goddard | June 15, 1920 |
| 1,616,906 | Kroedel | Feb. 8, 1927 |
| 1,828,140 | Heilpern | Oct. 20, 1931 |
| 1,933,823 | Nagel | Nov. 7, 1933 |
| 2,268,417 | Neuschafer | Dec. 30, 1941 |